United States Patent Office

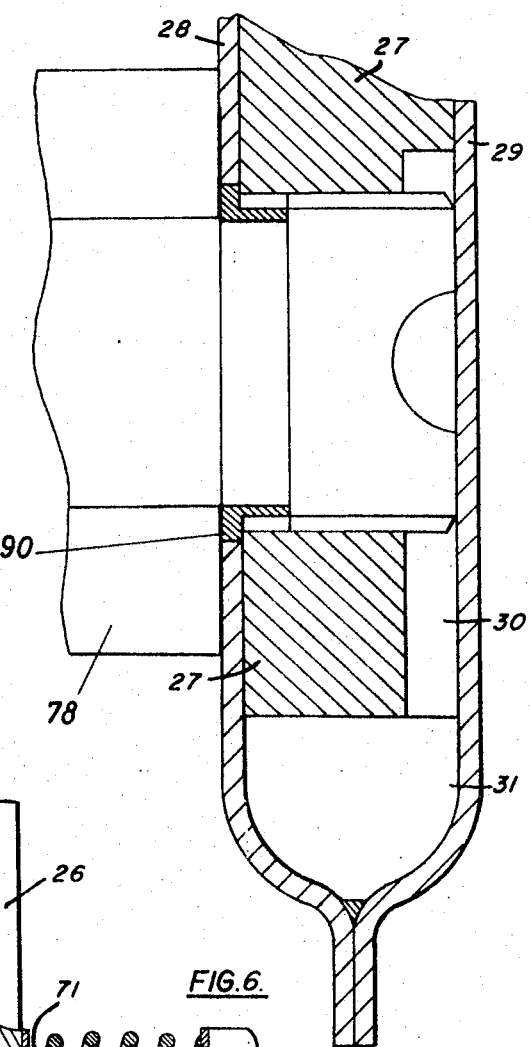
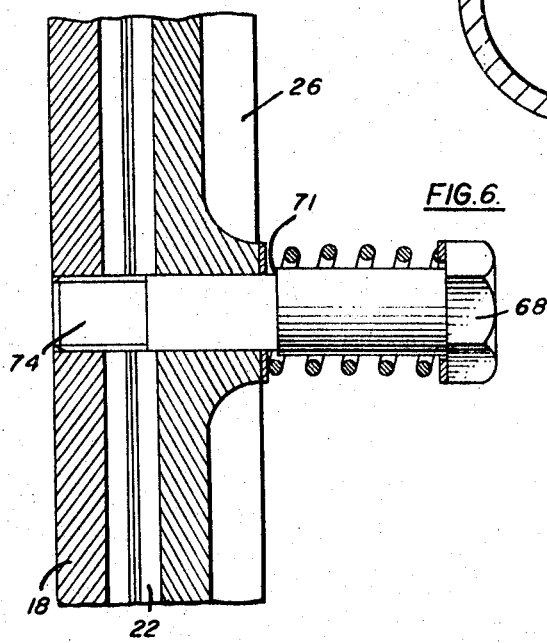

3,459,283
Patented Aug. 5, 1969

3,459,283
DIAPHRAGM OPERATED DISC BRAKE
Charles Newstead, Walsall, England, assignor to Girling Limited, Birmingham, England, a British company
Filed June 7, 1967, Ser. No. 644,174
Claims priority, application Great Britain, June 7, 1966, 25,222/66
Int. Cl. B60t 11/10; F01b 19/00; F16j 3/00
U.S. Cl. 188—152            5 Claims

ABSTRACT OF THE DISCLOSURE

A capsule type expander for inter position between a brake pad and a pressure member, a solid metal insert in the capsule to limit the required hydraulic fluid to operate the brakes and to serve as a stop to prevent the collapse of the capsule and movement of the brake pads in a releasing direction beyond a distance determined by the thickness of the insert.

---

This invention provides an actuator for hydraulically operable brakes to replace conventional piston and cylinder motors. The actuator comprises a metal walled capsule adapted for fitting between the rear of the braking element of friction material and a support. Hydraulic fluid supplied to the capsule under pressure causes the latter to expand and move the braking element into braking engagement wth the disc or drum of the brake, the reaction force being supplied by the support. In order to compensate for wear of the friction material forming the braking element the brake is provided with means to automatically adjust the rest position of the braking element. A plate member is mounted within the capsule, the plate occupying the major part of the internal volume of the capsule and serving the dual purpose of preventing inward collapse of the capsule and improving the response of the capsule to the introduction of hydraulic fluid. A sealed hydraulic actuator system can be built using a capsule as the transmitter and a second capsule as the receiver. Hydraulic fluid can be displaced from one capsule to the other by compressing the one and allowing the other to expand.

The present invention concerns hydraulic actuators, especially for road vehicle brakes and braking systems.

In a conventional disc brake arrangement, one or more pairs of friction pads having the individual members of each pair situated opposite one another and on opposite sides of a rotor such as a disc rotating with the wheel to be braked cooperate with actuating means usually including hydraulically operated piston and cylinder means which are energisable by pressure fluid for urging the friction pads towards the rotor. However, when large friction pads are required to be used, it becomes very difficult to achieve satisfactory actuation using means such as piston and cylinder motors with their relatively limited areas of contact with the friction pads.

Some problems are encountered when conventional drum brakes are considered and the present invention seeks to overcome these difficulties.

It is an object of the present invention also to prevent collapse of a capsule type expander unit beyond a predetermined amount when fluid pressure is withdrawn from said unit.

According to one aspect of the present invention in a brake comprising friction pad means, a support and means to automatically adjust the rest position of the friction pad means to compensate for wear of the friction pad means, the brake actuator comprises a metal walled capsule confined between the friction pad means and the support to receive brake fluid by which it is expanded to move the friction pad means into braking engagement with a brake member.

Preferably the capsule is of shallow configuration, having a thickness which is very much less than its length or breadth. The capsule preferably contains an internal plate occupying the major part of its internal volume the thickness of the plate being greater than half the internal spacing between the two large area walls of the capsule. The reduction in the internal volume of the capsule improves the response of the capsule to the introduction of pressure fluid.

The actuator may be used in a drum brake or in a disc brake having a swinging, or sliding, or fixed calliper or yoke.

It will be appreciated that by forming the capsule from metal, problems of overheating and damage, encountered when rubber and like materials have been used, are in the main, overcome. In addition, the combination of the metal walled capsule with an automatic adjuster to compensate for friction pad wear results in the capsule only having to expand and distort a sufficient amount to cause the friction pad means to engage the brake member.

It will be further appreciated that mechanically compressing a capsule proposed by the invention, when filled with an incomprehensible hydraulic fluid, will result in some of the fluid being ejected from the capsule. In consequence a complete hydraulic actuator system can be built by connecting two capsules by a hydraulic pipeline and using one as a transmitter and the other as a receiver such that when the transmitter is compressed for example in response to the downward movement of a foot-operated brake pedal, the receiver is caused to expand and operate, for example, a brake.

The transmitting capsule can of course be connected to any number of receiver capsules, to provide simultaneous and compensated braking on a number of independent wheels.

A mechanical advantage can be achieved by mounting a number of transmitter capsules in the form of a concertina and connecting all their fluid outputs to a common outlet for supplying hydraulic fluid to the receiver capsule or capsules. The total movement of the compressing means (e.g. foot petal) will be equal to the sum of the individual changes in thickness of the concertinered capsules when compressed.

According therefor to another aspect of the present invention in a hydraulic actuator system comprising a transmitter and receiver connected by a hydraulic pipeline, at least the receiver comprises at least one metal-walled capsule confined between a fixed or stationary member and a movable member and includes adjuster means for automatically adjusting the rest position of the movable member relative to the fixed member, to compensate for any variation in the travel of the movable member due to lost motion.

The invention will now be described further, by way of example, with reference to the accompanying drawings, in which:

FIG. 3 is a section through a capsule,

FIG. 6 is an enlarged horizontal cross-sectional view of a detail of the invention.

Figure 1:
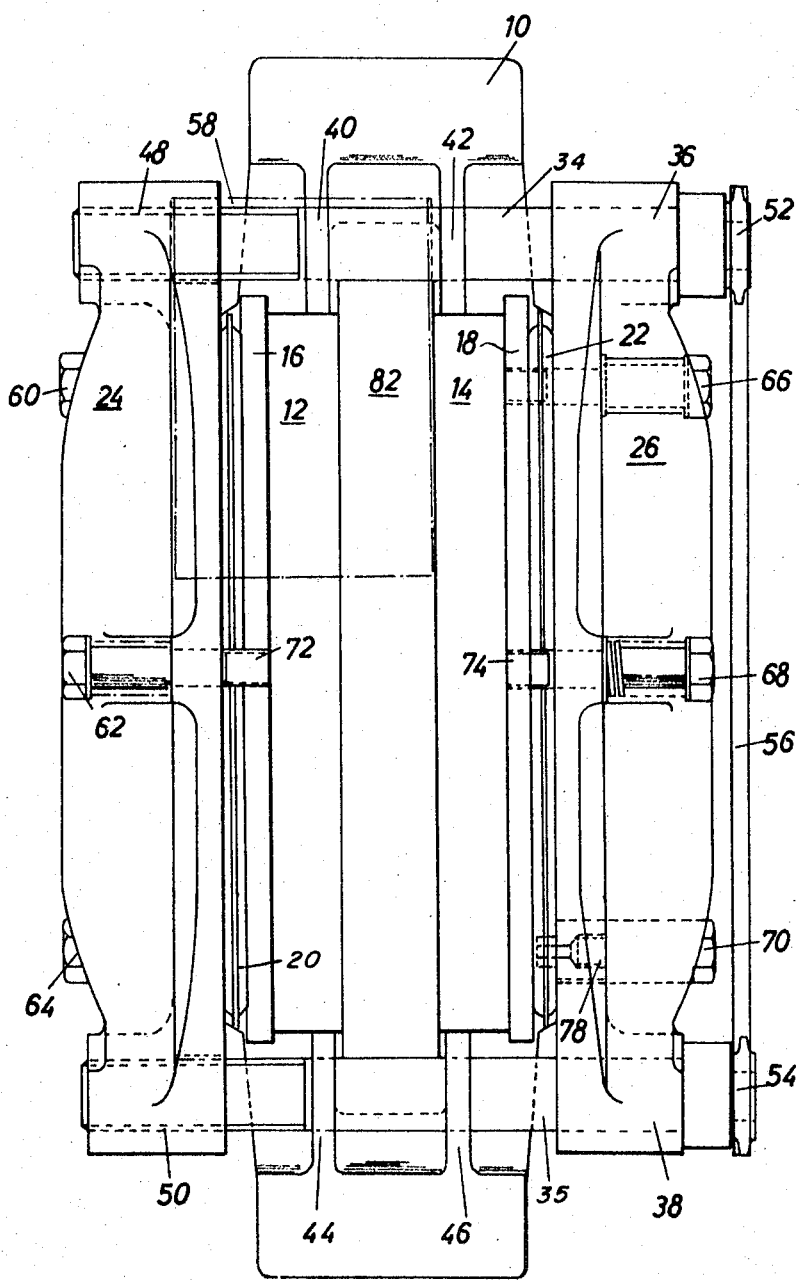
FIG. 1 is an end view, of a disc brake incorporating an actuator according to the invention.

In the drawings, a disc brake comprises a torque carrier 10, a pair of friction pads 12 and 14 mounted on back plates 16 and 18 respectively, two capsules 20 and 22 sandwiched between the back plates 16 and 18 and two pressure plates 24 and 26 respectively. Each capsule has a plate 27 (FIG. 3) within it thick enough to engage both walls 28, 29 of the capsule. The plate 27 has grooves 30 in it to insure satisfactory distribution of fluid. The plate 27 prevents inward collapse of the capsule and serves as a stop to limit the movement of each brake pad in a brake releasing direction. The perimeter of the plate 27 is spaced from the curved portions of the capsule walls as at 21 all around so that fluid flow is ensured to all parts.

The spacing between the two opposed large area walls of each capsule is governed by the minimum spacing required to allow fluid connections to be made to the capsule but should not be greater than necessary, so that fluid requirements are kept to a minimum. In practice a spacing of between 1/16" and 3/4" is envisaged depending on the application and size of brake etc. A preferred spacing is 1/4".

Figure 2:
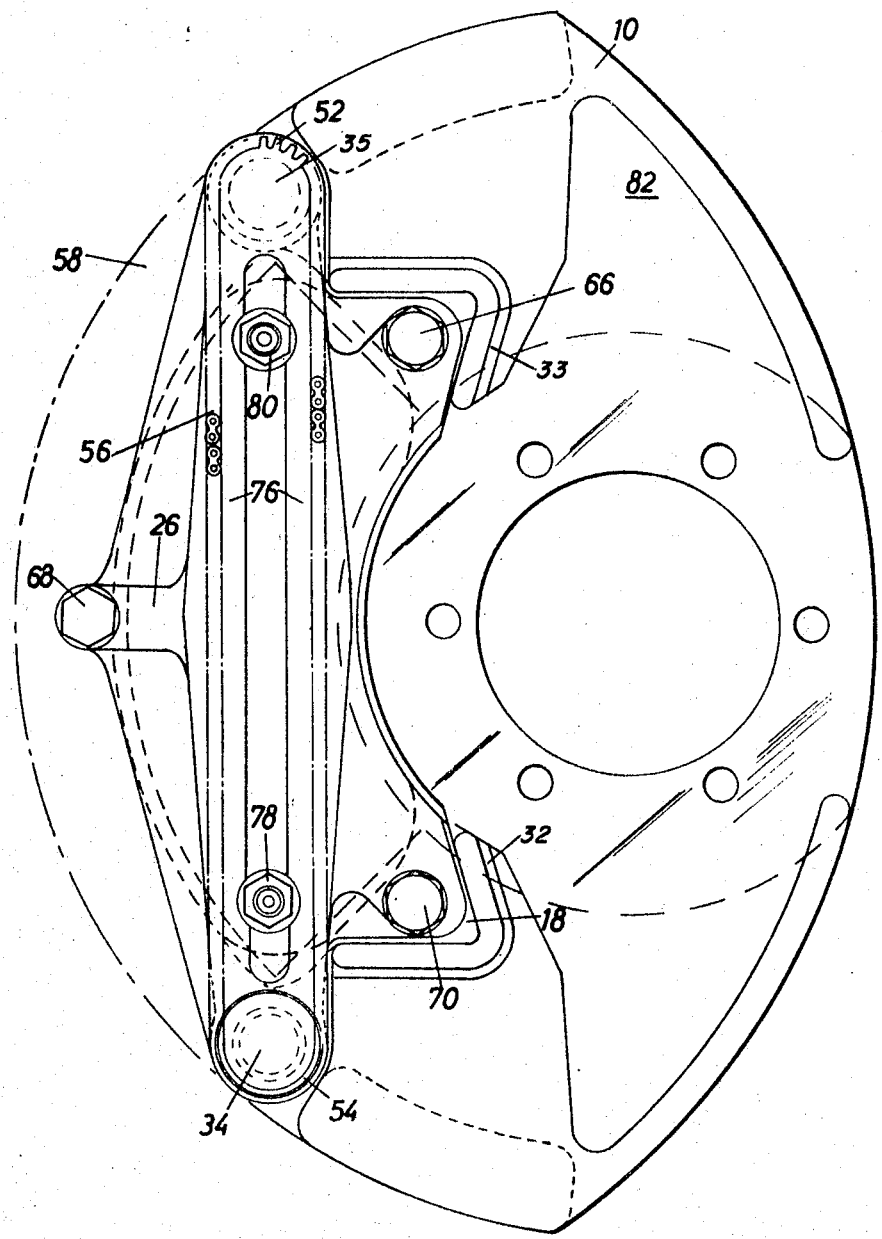
FIG. 2 is a side elevation of the disc brake illustrated in FIG. 1.

The relative positions of friction pad, back plate, capsule and pressure plate are identical on both sides of the brake and are such that the back plate, the pressure plate and the capsule have a common outline in the lower midregion of their trailing edges and the back plate and the pressure plate have a common outline in the upper midregion. The edges of the back plates 16 and 18 each engage a pair of abutment surfaces (one pair only (32 and 33) of which is shown in FIG. 2) of the torque carrier 10.

At the ends of the pressure plates 24 and 26, shafts 34 and 35, respectively, each screwed at one end, pass through holes 36 and 38 in the pressure plate 26, through eyed lugs 40, 42, 44 and 46 in the torque carrier 10 and the screw end engages with tapped holes 48 and 50 in the pressure plate 24. The two shafts 32 and 34 are connected for rotation together by sprockets 52 and 54 and chain 56. The shaft 32 is intended to be driven by the automatic adjuster mechanism 58. The bolts 60, 62, 64, 66, 68 and 70 pass through each pressure plate 24 and 26 clearing the capsules 20 and 22 and engage tapped holes 72 and 74 (only two shown in the corresponding back plates 16 and 18. The bolts 60, 62, 64, 66, 68 and 70 each have shoulders 71 which limit the expansion of the capsule and, as a result, the travel of the pad back plate relative to the pressure plate.

Each pressure plate 24 and 26 has two holes between a double rib 76 of the pressure plate and each hole receives a hexagonal part-screwed and tapped fluid adapter 78 and 80, one for connection to the fluid supply and the other to receive a fluid bleed screw (not shown). Each adapter 78 and 80 passes through an aperture in the capsule wall and its smaller diameter screwed end engages a tapped hole in the plate 27 within the capsule. The plate 27 is brazed at 90 around each aperture to form a seal. Each bolt receiving hole in the pressure plate has an associated rib which takes stress in the event of failure of the automatic adjuster 58.

The combination of chain sprockets 52 and 54 and chain 56 could be replaced by a reciprocating linkage with a pawl and ratchet mechanism between the linkage and each shaft.

The torque carrier 10 is mounted on the vehicle in the normal manner such that a disc 82 fixed, for example, to a road wheel of a vehicle (not shown can rotate between the friction pads 12 and 14 and is engaged by the pads 12 and 14 on application of fluid pressure to the capsules 20 and 22.

Figure 4:
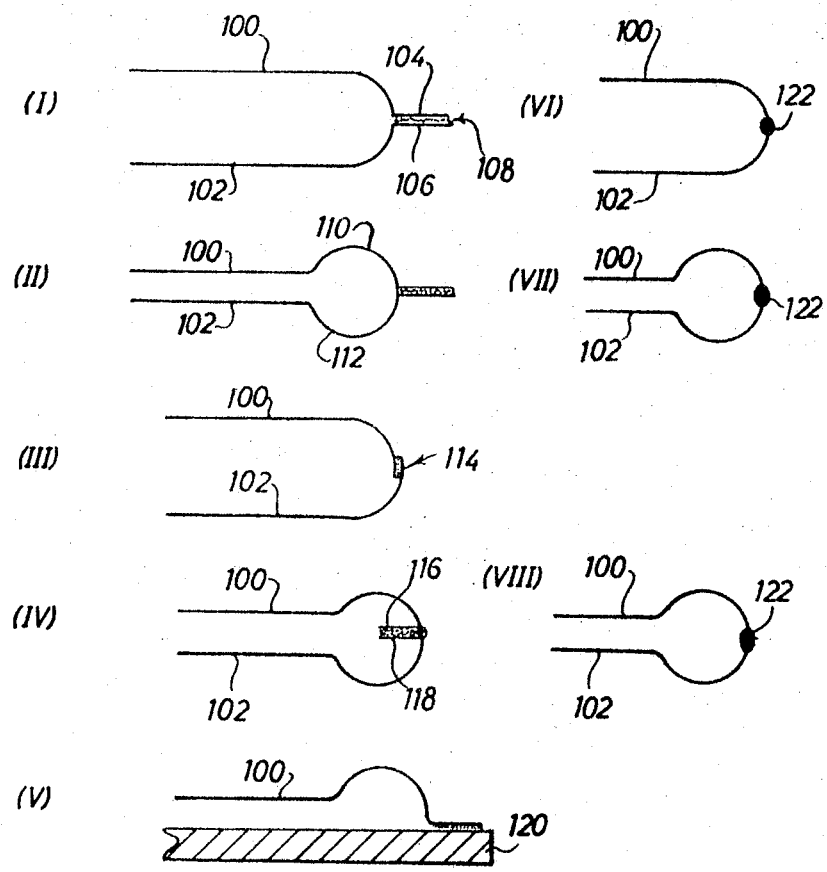
FIG. 4 shows various forms of construction of capsule.

The capsule may be constructed in various ways, examples of which are shown in FIG. 4. At (i) the capsule is shown formed by two shells 100, 102 having peripheral flanges 104, 106, respectively united by brazing or welding at 108.

At (ii) the capsule shells have bulbous margins 110, 112 adjacent the flanges in order to ensure minimum resistance to expansion of the capsule.

At (iii) a simple overlap joint is shown at 114.

At (iv) the shells have inwardly directed flanges 116, 118, respectively, welded or brazed together.

At (v) the capsule is shown made up of only one shell united to heavy plate 120 instead of two shells.

At (vi), (vii) and (viii) simple edge-to-edge joins 122 are used with bulbous margins to the shells.

In a disc brake constructed as described above there is the advantage that uniform loading can be applied over the friction pad, even when the pad extends over a substantial area of the disc. This is especially important where large pads are concerned and avoids the need for making them of several segments and resiliently mounting them in order to prevent local peak loading with excessive wear of the pad and the risk of damage to the disc.

By virtue of the distributed loading, very high torques can be realised by the brake.

The metal walls of the capsule have the advantage that they are capable of withstanding the pressure at their peripheral portions by tension, without noticeable stretching of those peripheral portions. Furthermore, since very little stretching of the peripheral portions occurs, the force due to the internal pressure within the capsule, acting as a bursting force around the join between the two shells forming the capsule, is kept substantially constant both during the life of the capsule and during each braking operation. Also, the capsule is resistant to heat and brake fluid and its performance is not hindered by high temperatures.

Figure 5:
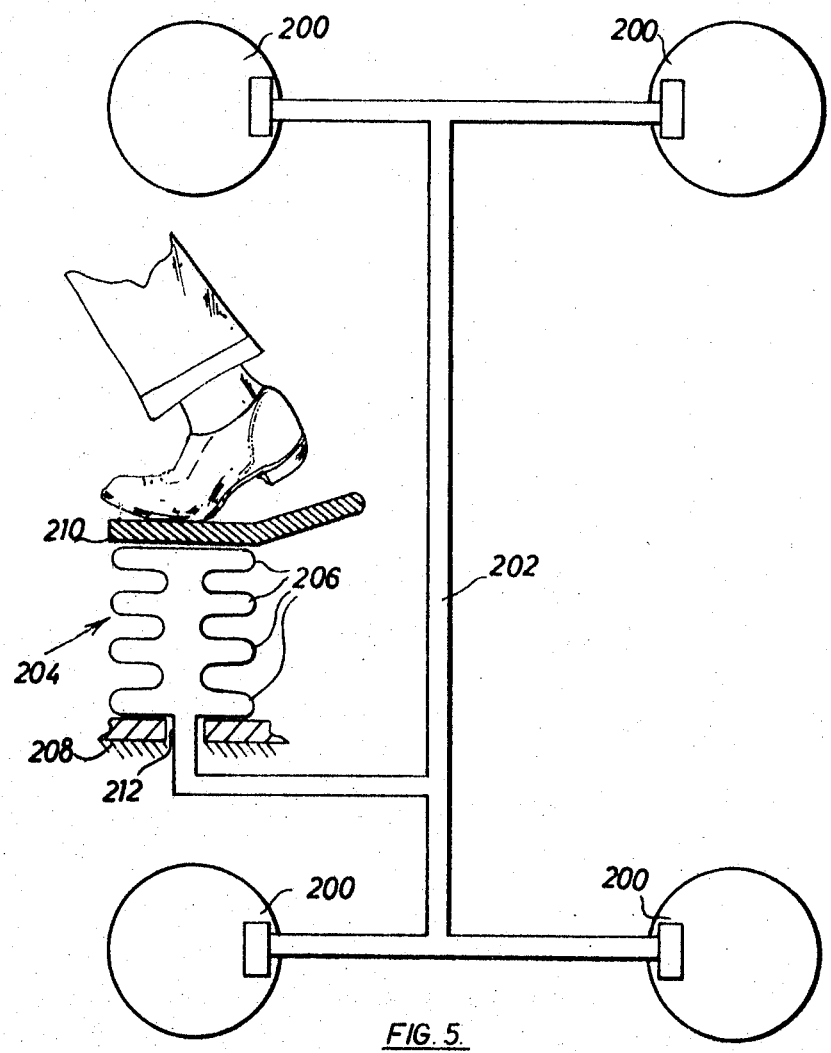
FIG. 5 illustrates a braking system incorporating actuators constructed in accordance wtih the invention.

FIG. 5 illustrates a hydraulic braking system which incorporates four brakes 200, fitted with capsule actuators constructed in accordance with the invention to which brake fluid are supplied along a hydraulic pipeline 202 from a hydraulic transmitter 204 which incorporates a number of metal-walled capsules 206 arranged in concertina fashion between a fixed or stationary member 208 and a movable member 210, with their fluid outputs connected to a common outlet 212 connected to the hydraulic pipeline. The movable member 210 is arranged for movement towards and away from the fixed member 208 and is conveniently in the form of a foot pedal, by which the concertina of capsules can be compressed to supply hydraulic fluid under pressure to the capsules in the brakes.

I claim:

1. In a capsule type expander unit for vehicle disc brakes and braking systems wherein the expander unit comprises a unitary closed expansible capsule having oppositely displaceable walls for interposition between a friction member and a pressure member, said friction member being at all times engageable with one of the displaceable walls of said capsule, said capsule being adapted to receive brake fluid under pressure by which it is expanded to move the friction member in a brake applying direction, a solid body member within and occupying the greater part of the enclosed volume of said capsule to limit the volume of fluid required to actuate the brakes, said body member being secured to one of the walls of said capsule and being engaged by the other wall of said capsule upon release of said brakes to prevent the collapse of said capsule and the movement of said friction member away from said disc beyond the amount determined by the thickness of said body member.

2. In a capsule type expander unit as set forth in claim 1, a mechanical connection to permit only a predetermined amount of free movement between said friction member and pressure member to limit the stroke of the expander unit.

3. In a capsule type expander unit as set forth in claim 1, wherein the body member is grooved to ensure satisfactory distribution of fluid within the capsule.

4. In a capsule type expander unit as set forth in claim 1, the capsule expander unit comprises two shells having peripheral flanges which are mounted back-to-back with the flanges in contact and are joined around the edges of the two flanges.

5. In a capsule type expander unit as set forth in claim 1, the capsule expander unit is formed from metal.

References Cited

UNITED STATES PATENTS

| | | |
|---|---|---|
| 976,060 | 11/1910 | Fulton _____ 92—47 |
| 1,730,953 | 10/1929 | Stephens. |
| 2,030,340 | 2/1936 | White. |
| 2,174,635 | 10/1939 | Linderman. |
| 2,672,223 | 3/1954 | Butler. |
| 2,784,811 | 3/1957 | Butler |

FOREIGN PATENTS

| | | |
|---|---|---|
| 1,119,430 | 4/1956 | France. |
| 892,076 | 10/1953 | Germany. |
| 236,584 | 11/1926 | Great Britain. |
| 1,424,951 | 12/1965 | France. |

GEORGE E. A. HALVOSA, Primary Examiner

U.S. Cl. X.R.

92—34, 91